United States Patent [19]

Moriarty

[11] Patent Number: 5,615,101
[45] Date of Patent: Mar. 25, 1997

[54] POWER CONVERTER WITH HIGH POWER FACTOR

[75] Inventor: John K. Moriarty, Reading, Pa.

[73] Assignee: Lucent Technologies Inc., Murray Hill, N.J.

[21] Appl. No.: 365,656

[22] Filed: Dec. 29, 1994

[51] Int. Cl.⁶ ........................................... H02M 7/00
[52] U.S. Cl. ..................... 363/101; 323/222; 323/224; 323/271
[58] Field of Search .................... 323/222–225, 323/259, 283, 285, 286, 271; 363/16, 17, 101

[56] References Cited

U.S. PATENT DOCUMENTS

| | | | |
|---|---|---|---|
| 5,073,849 | 12/1991 | Morris | 363/16 |
| 5,097,196 | 3/1992 | Schoneman | 323/222 |
| 5,235,504 | 8/1993 | Sood | 363/53 |
| 5,307,004 | 4/1994 | Carsten | 323/222 |
| 5,475,296 | 12/1995 | Vinsant et al. | 323/223 |
| 5,506,493 | 4/1996 | Stengel | 323/223 |

*Primary Examiner*—Peter S. Wong
*Assistant Examiner*—Shawn Riley

[57] ABSTRACT

A buck-boost power converter for powering a load from an AC power source having a full resonant circuit for applying an alternating voltage to the load. A choke is connected to the full resonant circuit and a switching device switches the choke in quasi-resonant manner to an input power rectifier to produce high power factor power conversion.

15 Claims, 4 Drawing Sheets

POWER CONVERTER WITH HIGH POWER FACTOR

BACKGROUND OF THE INVENTION

1. Field of the Invention

The present invention relates to a power converter for powering a load from an AC source and for improving the power factor of the load.

2. Discussion of the Related Art

Electronic ballasts are frequently used instead of magnetic ballasts to control nonlinear loads such as fluorescent lamps. Compared to magnetic ballasts, electronic ballasts are smaller and lighter, do not have the flicker associated with 60 Hz power mains, and are more efficient. Electronic ballasts are especially desirable for powering the compact, consumer fluorescent lamps that are becoming more popular.

Most compact electronic ballasts consist of discrete components, including power transistors and pulse transformers. FIG. 1 shows a typical electronic ballast. As shown, the electronic ballast includes a half bridge totem pole driver formed from two discrete power MOSFET or bipolar transistors. The half bridge output drives a resonant load by means of feedback from a pulse transformer T1 whose primary winding is connected in series with the load. Each of two secondary windings of the transformer is connected to the input terminal of the half bridge transistors such that the load is driven synchronously. The LC resonating elements provide substantially sinusoidally varying voltage and/or current waveforms Since the switching frequency at the load is higher than the line frequency, small reactive components may be used, reducing the bulk and size of the ballast.

A disadvantage of the circuit of FIG. 1 is the operation of the circuit at low power factor, i.e., the current drawn from the power source is out-of-phase (usually leading) with the power source voltage, e.g., at about 50 to 60% lead. The low power factor is largely due to the circuit of FIG. 1 being configured with a peak detector rectifier and that the only time power is drawn from the source is when the source voltage is higher than the load voltage.

The power converter according to the present invention avoids the above disadvantage and operates with high power factor.

SUMMARY OF THE INVENTION

The power converter according to the present invention is a buck-boost converter adapted to power a load from an AC source. The converter comprises: (a) an AC to DC conversion device; (b) a resonator for applying an alternative voltage across the load, the resonator having: (i) a resonant circuit having a resonant coil and a resonant capacitor; (ii) a first switching device and a second switching device, each being connected to the load through the resonant circuit; (iii) a controller for alternately switching on the first and second switch devices; and (iv) an energy storage device, connected to one of the first and second switches for alternately providing energy to the resonant circuit; (c) a choke operatively connected to the first and second switching devices and the resonant circuit; and (d) a third switching device for selectively connecting the choke to the AC to DC conversion device for causing the third switching device to switch in a zero voltage or zero current switching mode.

Preferably, the third switching device of the power converter is configured to switch in a quasi-resonant mode and the first, second and third switching devices are configured to cause current flow through the choke in phase proportion to the AC source voltage. Further, the first and second switching devices are preferably configured to alternately connect the load and the resonant circuit to a high voltage and to ground, at around 50% duty cycle. The third switching device is also configured to substantially coincide with the turn on and off of one of the first and second switching devices.

Advantageously, the power converter according to the present invention utilizes the high power factor characteristics of a buck-boost converter operated in the discontinuous mode and whereby the power converter effectively sees only the charge cycle of the source voltage, when the current drawn from the power source is in phase with the source voltage. The zero voltage switching, quasi-resonant effects also provide reduced switching losses and stresses and improved power efficiency.

BRIEF DESCRIPTION OF THE DRAWINGS

The advantages and features of the buck-boost power converter according to the present invention will become more readily apparent from the following detailed description of the preferred embodiments of the invention taken in conjunction with the drawings, in which.

DETAILED DESCRIPTION OF THE PREFERRED EMBODIMENT

The power converter according to the present invention is a buck-boost power converter, which selectively applies voltage to the load which may be higher or lower than the supply voltage.

Figure 1:
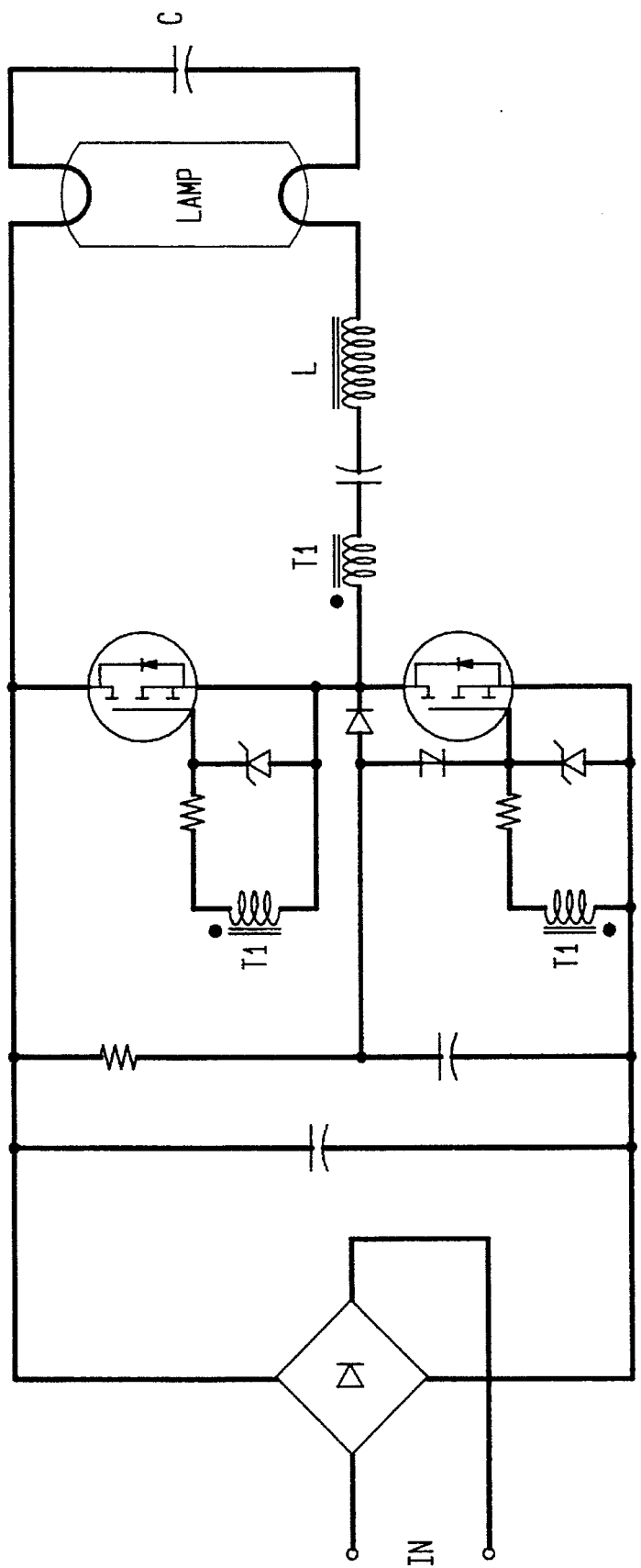
FIG. 1 is a schematic of a prior art power converter.
Figure 2:
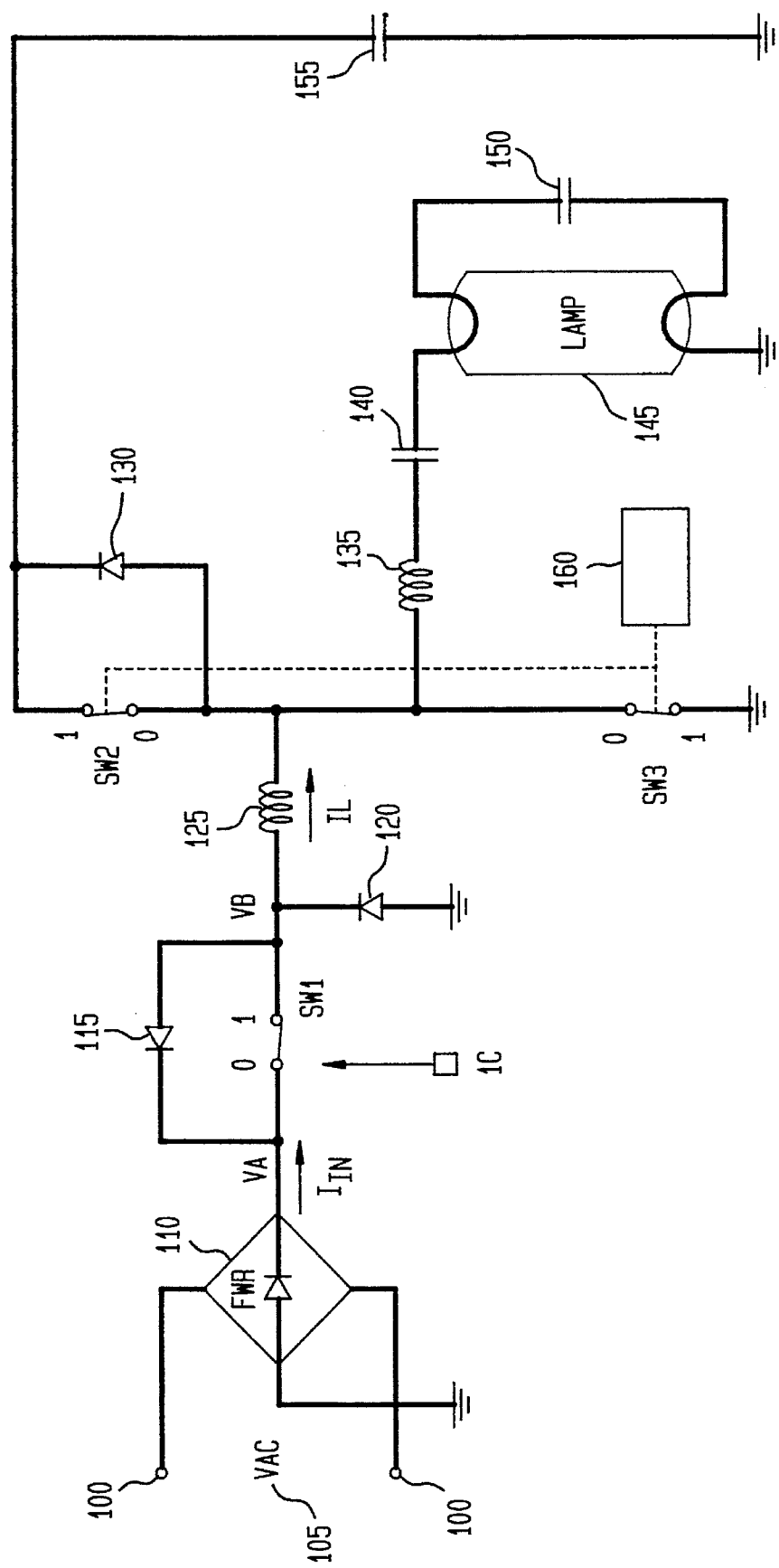
FIG. 2 is a simplified schematic or the buck-boost power converter according to the present invention.

In FIG. 2, the converter according to the invention receives an AC voltage from an AC power source VAC 105 and provides the load, in this case a fluorescent lamp, with alternating voltage. As shown, the lamp 145 is configured to receive power from a resonating circuit connected to power node VC through resonant coil 135 and resonant capacitor 140. Upper switch S2 is alternately switched with lower switch S3 to provide alternating current flow through the resonant circuit and the load 145. An optional capacitor 150 is connected in parallel to the lamp for providing a current path and in the present embodiment, to preheat the lamp filament as well. Switches S2 and S3 are preferably gating or switching devices such as one or more transistors and are controlled from a switch controller 160. Preferably, S2 is turned on when S3 is turned off and vice versa, and at around 50% duty cycle. The circuitry of switch controller 160 for controlling the switches S2 and S3 are known to one skilled in the art. Diode 130 is connected to power node VC and across switch S2 to slew current that are present when both S2 and S3 are momentarily off during switching transitions. The circuit hereto described is commonly known as a fully resonant circuit.

Turning to the circuitry disposed and connected to the left of the power node VC, a full wave rectifier (FWR) 110 is connected across the input leads 100 for receiving an AC power source from VAC 105. The FWR 110 rectifies the VAC into a full wave DC voltage.

Choke 125 is connected to the FWR 110 through a switch S1, which selectively switches the choke 125 for selectively storing and discharging energy to the fully resonant circuit. Preferably, the turn-on and off of switch S1 is to coincide with the turn-on and off of switch S3. Diode 120 provides a ground path for choke 125 and diode 115 provides a return path for current flow from right to left when switch S1 is opened.

Figure 3:
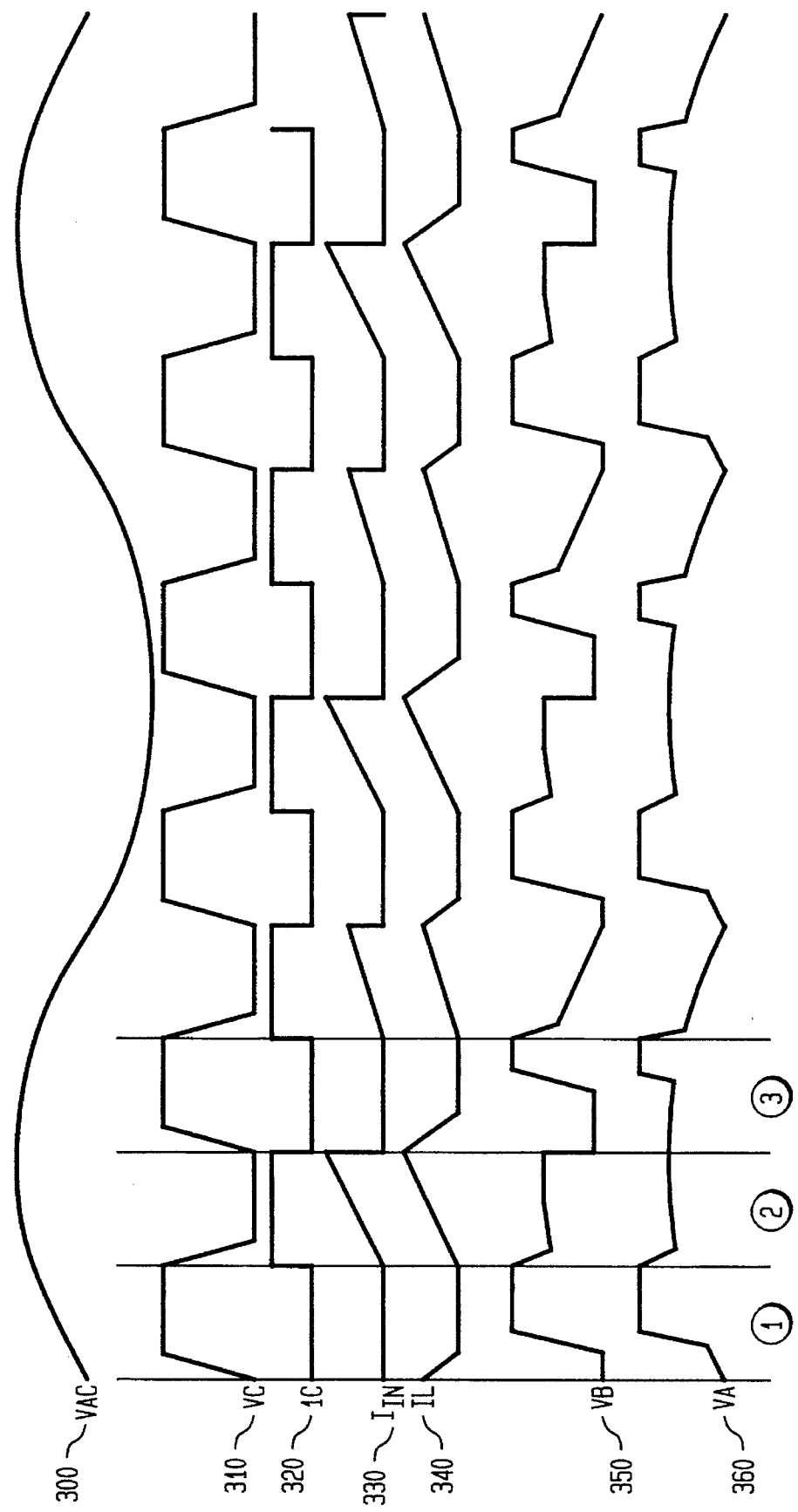
FIG. 3 is a diagram illustrating the signal waveshapes of the buck-boost power converter of FIG. 2.

The operation of the converter of FIG. 2 is explained with the aid of the waveshape diagrams of FIG. 3. Referring to FIG. 3, VAC is the given voltage source. The fully resonant circuit connected to the right of choke 125 produces a resonating voltage waveshape at node VC. When switch S2 is on and S3 is off e.g., during time 1, a positive voltage is present at VC. When switch S3 is on (closed) and switch S2 is off (open), the voltage at VC is brought to ground and is zero. The turn-on and off of switch S1 is shown as waveshape 1C. When voltage 1C is high, switch S1 is closed or connected to node 1 of switch S1. It can be seen that the turn-on of switch S1 coincides with the voltage VC discharging to ground and S1 is turned off when voltage VC begins to rise to the high state. Waveshape VC shows the voltage sloping caused by the zero voltage switching of the fully resonant circuit.

The power converter according to the present invention takes advantage of the fully resonant circuit configuration to the right of choke 125 by interacting with the resonant signal at node VC to create a zero voltage switching, quasi-resonant effect as viewed from the choke 125. This effect can be seen from the waveshapes of the current IL through the choke 125 and the voltage VB, VA and VC.

To illustrate and referring again to FIG. 3, at time 2, when switch S1 is on (closed), switch S2 is opened, and switch S3 is closed, voltage VC is pulled to ground by switch S3, voltage VB follows voltage VA when switch S1 is closed. Soon after the start of time 2, VB is at a higher voltage level than VC, current IL of choke 125 rises and energy is stored in choke 125 following the formula $$V_{choke} = L \frac{di}{dt}.$$

Current $I_{IN}$ follows IL during the duration of the closure of switch S1.

When switch S2 closes and switch S3 opens, as shown in time 3, VC rises to the high voltage level. With switch S1 also open, choke current IL is drawn from the energy stored in the choke 125. VB is thus pulled negative until it is clamped by diode 120. When current IL is fully discharged, choke 125 has zero voltage, VB then follows VC. When VB is more positive than VA by greater than the threshold voltage of diode 115, diode 115 conducts and VA substantially follows VB. Current $I_{IN}$ is zero during this time. The process in times 2 and 3 repeats. It can be seen from FIG. 3 that the peak current of $I_{IN}$ is proportional to the peaks of the input voltage source VAC, i.e., the $I_{IN}$ peak is higher at the higher portion of the VAC. Thus, the average current drawn from the power source is approximately in direct phase relation with the power source.

It is apparent to one skilled in the art that this direct phase relation improves as the switching frequency of the switches S1, S2 and S3 increases. FIG. 3 is therefore drawn to facilitate better understanding of the invention but in actual operation, the switching frequencies of the switches are much higher than as appears in FIG. 3.

Figure 4:
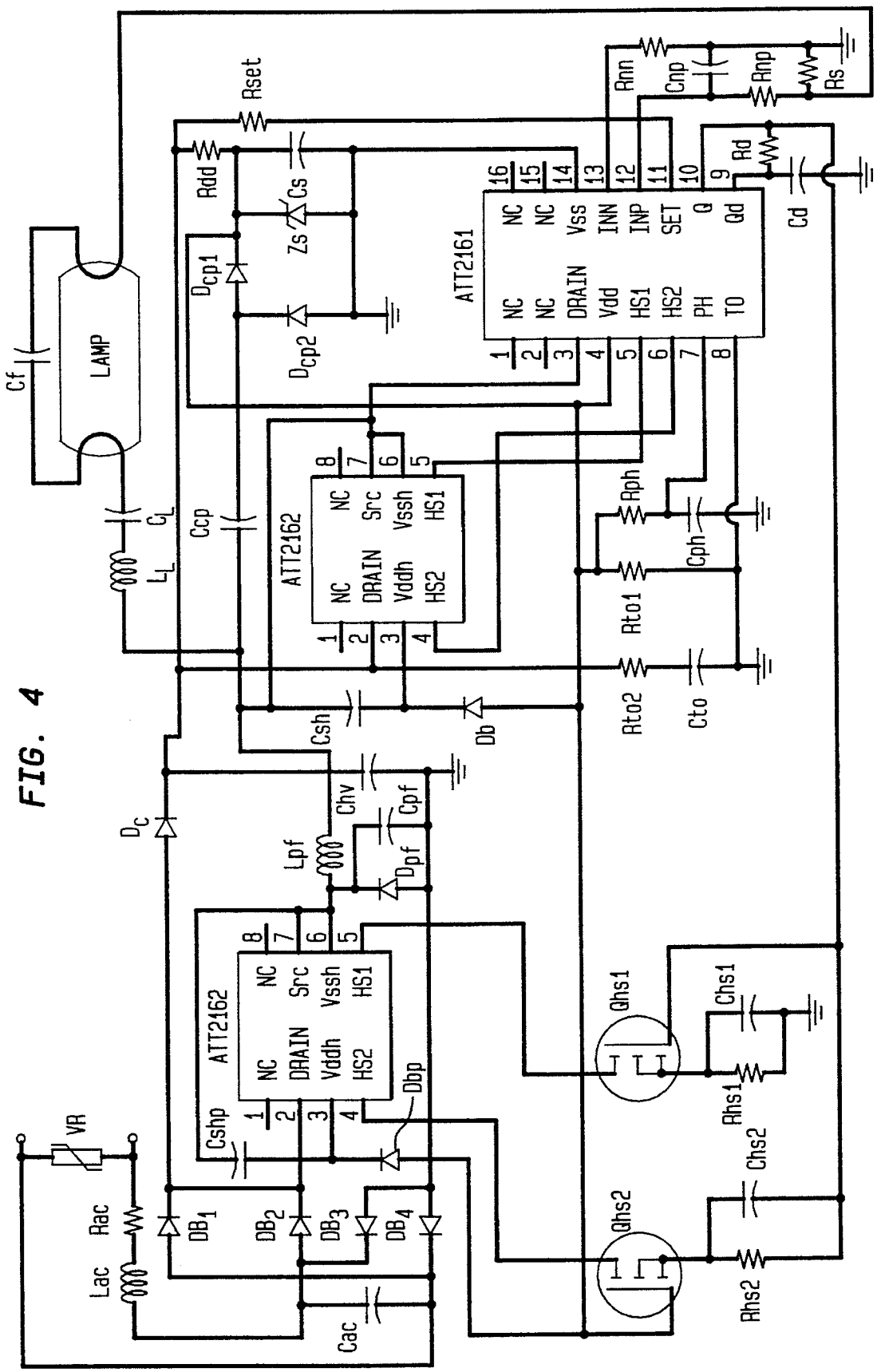
FIG. 4 is a schematic diagram of an implementation of the buck-boost power converter of FIG. 2.

FIG. 4 shows an implementation of the power converter of FIG. 2. Referring to FIG. 4, the FWR 110 of FIG. 2 is formed by four diodes DB 1 to DB4, a high side ballast chip, such as model ATT 2162, available from AT&T Corp., is preferably used as switches S1 and S2 and a low side ballast controller chip, model ATT 2161, also available from AT&T Corp. is used as switch S3. The ATT 2161 includes a high voltage FET to implement the low side switch in a fully resonant ballast such as switch S3 of FIG. 2. Also included in the ATT 2161 is the timing control circuity for switching at appropriate dead times for zero voltage switching, and level shifting circuits to level shift outputs for proper interface to the ATT 2162. The capacitor Cto and resistors Rto2 and Rto1 provide the oscillation or clock to the ATT 2161 and ATT 2162. The ATT 2162 also includes a high voltage FET to implement the high side (positive rail) switch. The resonant coil LL, resonant capacitor CL and lamp of FIG. 4 perform the same functions as coil 135, capacitor 140 and load 145 of FIG. 2, respectively. Choke LPF of FIG. 4 is the same as choke 125 of FIG. 2.

It is understood that the embodiments of the invention described herein are illustrative of the application of the principles of the invention. Other arrangements, modifications and methods can be implemented by those skilled in the art without departing from the spirit and scope of the present invention.

What is claimed is:

1. A buck-boost power converter for powering a load with an AC source, comprising:
   (a) an AC to DC conversion device;
   (b) a resonator for alternately applying an alternating voltage across said load, said resonator having:
      (i) a resonant circuit having a resonant coil and a resonant capacitor;
      (ii) a first switching device and a second switching device, each being connected across said load through said resonant circuit; and
      (iii) a controller for alternately switching on said first and second switching devices at a switching frequency substantially higher than a frequency of said AC source;
   (c) a choke operatively connected to said first and second switching devices and said resonant circuit, for alternately providing energy to said resonant circuit; and
   (d) a third switching device for selectively connecting said choke to said AC to DC conversion device, said third switching device being controlled to switch substantially in tandem with one of said first and second switching devices for causing said power converter to switch in a zero voltage switching mode, wherein average current drawn from said AC source over each high frequency switching cycle is proportional to instantaneous voltage of said AC source to provide operation of said power converter with a quasi-resonant effect and with a high power factor.

2. The power converter of claim 1, wherein said third switching device is configured to switch in a quasi-resonant mode.

3. The power converter of claim 1, wherein said first and second switching devices are configured to alternately connect said load and said resonant circuit to a high level voltage and to ground.

4. The power converter of claim 3, wherein said first and second switching devices alternately connect said load and said resonant circuit to a high level voltage and to ground at around 50% duty cycle.

5. The power converter of claim 1, wherein said AC to DC conversion device is a full wave rectifier.

6. A power converter for powering a load with an AC source, comprising:

full resonant switch means for alternately powering said load, said full resonant switch means including a resonant circuit coupled to said load, first and second switches each connected across said load through said resonant circuit, and a controller for alternately switching on said first and second switches at a switching frequency substantially higher than a frequency of said AC source;

energy storage means connected to said resonant switching means;

a rectifier for rectifying said AC source;

a choke connected to said full resonant switch means; and connection means connected to said rectifier and said choke for selectively connecting said choke to said rectifier, said connection means including a third switch controlled to switch on and off substantially in tandem with one of said first and second switches;

wherein average current drawn from said AC source over each high frequency switching cycle is proportional to instantaneous voltage of said AC source to provide operation of said power converter with a quasi-resonant effect and with a high power factor.

7. The power converter of claim 6, further including means for selectively applying voltage to said load, said applied voltage being at higher level at some times and at lower level at other times than said AC source.

8. The power converter of claim 6, wherein said full resonant switching means switches in a zero voltage switching mode.

9. The power converter of claim 6, wherein said connection means switches in a zero voltage switching mode.

10. The power converter of claim 6, wherein said load is a fluorescent lamp.

11. The power converter of claim 6, wherein said full resonant switch means includes a coil and a capacitor which resonate at a predetermined frequency and at least one switching device for alternately switching said coil and said capacitor between a high voltage level and ground.

12. The power converter of claim 6, wherein said rectifier is a full wave rectifier.

13. The power converter according to claim 1, further comprising:

a first diode connected in parallel across said third switching device to provide a current path from said choke to said AC to DC conversion device when said third switch is switched into an off state; and a second diode having an anode connected to ground potential and a cathode connected to a circuit node between said choke and said third switching device, said second diode providing a ground path for said choke and clamping negative voltage at said circuit node with respect to ground potential.

14. The power converter according to claim 1, wherein a current waveform of current drawn from said AC source comprises a plurality of successive sawtooth waveforms each corresponding to one cycle of said high frequency switching, wherein a peak of each sawtooth waveform is proportional to said instantaneous AC source voltage, whereby current drawn from said AC source over each AC source frequency cycle is substantially in phase with said AC source voltage.

15. The power converter according to claim 6, a current waveform of current drawn from said AC source comprises a plurality of successive sawtooth waveforms each corresponding to one cycle of said high frequency switching, wherein a peak of each sawtooth waveform is proportional to said instantaneous AC source voltage, whereby current drawn from said AC source over each AC source frequency cycle is substantially in phase with said AC source voltage.

* * * * *